(12) United States Patent
Maehana et al.

(10) Patent No.: US 11,794,253 B2
(45) Date of Patent: Oct. 24, 2023

(54) THREE-DIMENSIONAL SHAPING METHOD AND THREE-DIMENSIONAL SHAPING DEVICE

(71) Applicant: KOMATSU NTC LTD., Toyama (JP)

(72) Inventors: Hidekazu Maehana, Toyama (JP); Daisuke Noda, Toyama (JP); Ayumi Aradachi, Toyama (JP); Tsunemoto Kuriyagawa, Miyagi (JP); Masayoshi Mizutani, Miyagi (JP)

(73) Assignee: KOMATSU NTC LTD., Toyama (JP)

( * ) Notice: Subject to any disclaimer, the term of this patent is extended or adjusted under 35 U.S.C. 154(b) by 324 days.

(21) Appl. No.: 17/254,789

(22) PCT Filed: Mar. 4, 2019

(86) PCT No.: PCT/JP2019/008398
§ 371 (c)(1),
(2) Date: Dec. 21, 2020

(87) PCT Pub. No.: WO2019/244415
PCT Pub. Date: Dec. 26, 2019

(65) Prior Publication Data
US 2021/0260662 A1    Aug. 26, 2021

(30) Foreign Application Priority Data

Jun. 20, 2018    (JP) ................................. 2018-116749

(51) Int. Cl.
*B22F 10/28*      (2021.01)
*B22F 10/36*      (2021.01)
(Continued)

(52) U.S. Cl.
CPC .......... *B22F 10/36* (2021.01); *B23K 26/0604* (2013.01); *B23K 26/0622* (2015.10);
(Continued)

(58) Field of Classification Search
None
See application file for complete search history.

(56) References Cited

U.S. PATENT DOCUMENTS 6,483,072 B2    11/2002   Tsukamoto
8,585,853 B2    11/2013   Yamamoto
(Continued)

FOREIGN PATENT DOCUMENTS

JP    2001259873 A1 *   9/2001   ............ B23K 26/00
JP    2004124200        4/2004
(Continued)

OTHER PUBLICATIONS

Machine translation of JP 2016502596 A1 performed on Dec. 29, 2022, Kenny et al. (Year: 2016).*
(Continued)

*Primary Examiner* — Brian W Jennison
*Assistant Examiner* — Kevin Guanhua Wen
(74) *Attorney, Agent, or Firm* — CRGO Global; Steven M. Greenberg

(57) ABSTRACT

The three-dimensional shaping device (100) is provided with a layer forming device (10) to form a layer of metal powder (90) on a shaping object, and a laser light irradiation device (20) to irradiate the layer of metal powder (90) formed by the layer forming device (10) with a laser light (25). The laser light (25) to be used in the three-dimensional shaping device (100) has a pulsed output waveform with a frequency of 5 to 200 kHz, a pulse width of 5 to 200 µs and a peak output of 10 to 500 W. Further, an overlap rate, which is a rate at which irradiation spots on the layer of metal powder (90) by two successive pulses of the laser light (25) overlap with each other, is 50 to 99.9%. Hereby, it is possible to provide a three-dimensional shaping method and a three-dimensional shaping device which can shape a shaping body having a narrower shaping width.

3 Claims, 3 Drawing Sheets

(51) Int. Cl.
  *B23K 26/0622* (2014.01)
  *B23K 26/342* (2014.01)
  *B23K 26/06* (2014.01)
  *B33Y 10/00* (2015.01)
  *B33Y 30/00* (2015.01)

(52) U.S. Cl.
  CPC ............ *B23K 26/342* (2015.10); *B33Y 10/00* (2014.12); *B33Y 30/00* (2014.12)

(56) References Cited

U.S. PATENT DOCUMENTS

| | | |
|---|---|---|
| 10,124,408 B2 | 11/2018 | Kenney et al. |
| 2002/0014476 A1 | 2/2002 | Arakane |
| 2011/0285060 A1 | 11/2011 | Yamamoto |

FOREIGN PATENT DOCUMENTS

| | | | |
|---|---|---|---|
| JP | 2011241450 A | 12/2011 | |
| JP | 2016502596 | 1/2016 | |
| JP | 2016502596 A1 * | 1/2016 | ............ B33Y 50/00 |
| JP | 2016536516 A1 * | 11/2016 | ............ B22F 10/47 |

OTHER PUBLICATIONS

Machine translation of JP 2001259873 A1 performed on Dec. 29, 2022, Tsukamoto et al. (Year: 2001).*
Machine translation of JP 2016536516 A1 performed on Dec. 29, 2022, Gerald et al. (Year: 2016).*
Notice of Reasons for Refusal in Japanese Patent Application No. 2018-116749 (dated Mar. 11, 2022).
International Search Report, PCT/JP2019/008398, dated May 14, 2019.

* cited by examiner

THREE-DIMENSIONAL SHAPING METHOD AND THREE-DIMENSIONAL SHAPING DEVICE

CROSS-REFERENCE TO RELATED APPLICATIONS

This application is a § 371 national phase entry of International Application No. PCT/JP2019/008398, filed Mar. 4, 2019, which claims priority to Japanese Patent Application No. 2018-116749, filed Jun. 20, 2018.

TECHNICAL FIELD

The present invention relates to a three-dimensional shaping method and a three-dimensional shaping device.

BACKGROUND ART

As a three-dimensional shaping technique, there is known a powder bed fusion bonding method (hereinafter, referred to as PBF (Powder Bed Fusion) method) (for example, refer to Patent literature 1).

In the PBF method, powder is horizontally spread with use of a roller or a blade, then a programmed laser light is scanned over it, so that the powder is melted and bonded. A shaping layer having an aimed shape is shaped according to the track of the scanning. After that, such a shaping layer is repeatedly laminated, so that a three-dimensional complex shape is shaped. In this method, in a state that molten parts of the powder, which has become masses as parts of a product, and unmelted powder filling spaces between the masses coexist as a lower layer of the product, new powder layers are laminated thereon one after another. Such unmelted powder is not removed until the final three-dimensional product is completed. The filled unmelted powder serves as a base for the powder to become an upper layer structure, so that a structure (hereinafter, referred to as "beam structure") having a shape in which beam parts and column parts are formed into a complex structure can be shaped.

In this way, the PBF method is capable of shaping of a hollow complex shape which cannot be realized by removal processing. In particular, a beam structure such as a lattice structure or porous structure can be produced by the PBF method. By applying this beam structure to apart of the shape of an existing component, for example, a component having a high strength and a lightweight can be produced. In this way, various benefits can be obtained. For example, by incorporating the beam structure as a part of a metal component, an artificial bone, which makes it easier to promote the invasion of bone cells and has a strength equivalent to a solid structure and a light weight, can be produced. In addition, attention is focused on the development of various products to which the beam structure is applied.

PRIOR ART LITERATURE

Patent Literature

Patent literature 1: JP 2004-124200 A

SUMMARY OF THE INVENTION

Problems to be Solved by the Invention

In order to narrow a shaping width in a three-dimensional shaping technique such as the PBF method, reducing an output of a laser light and increasing a scanning speed (shaping speed) of the laser light as processing parameters, narrow the molten region, so that these parameters are generally effective. However, adjusting the processing parameters in this direction tends to induce a spherical mass called a balling defect larger than the aimed shaping width. Therefore, it is difficult to obtain a continuous shaping body.

In order for a particle of metal powder to join to a structure directly below the particle with use of heat sources, it is necessary that the particle is melted and a molten pool in the structure directly below the particle is formed. When the particle and the molten pool are mixed with each other to coagulate, the joining is completed. In this case, if the amount of heat is not enough because of reducing of the output or the like, the molten pool is not formed in the structure, only the particle having a small heat capacity is melted, and particles around itself are captured by the surface tension to become a larger mass. This can be thought as one of causes of the balling defect.

Consequently, the minimum width (shaping width) where continuity in a shaping body obtained by the three-dimensional shaping technique can be kept is generally larger than 150 μm, so that miniaturization of beam parts and column parts forming up the beam structure has a limitation.

An object of the present invention is to provide a three-dimensional shaping method and a three-dimensional shaping device capable of shaping a shaping body having a narrower shaping width.

Means for Solving the Problems

In order to solve the problems, a three-dimensional shaping method according to the present invention comprises: a layer forming process to form a layer of metal powder on a shaping object; and a laser light irradiation process to irradiate the layer of metal powder formed in the layer forming process with a laser light. The laser light has a pulsed output waveform with a frequency of 5 to 200 kHz, a pulse width of 5 to 200 μs and a peak output of 10 to 500 W. Further, an overlap rate, which is a rate at which irradiation spots generated on the layer of metal powder by two successive pulses of the laser light are overlapped with each other, is 50 to 99.9%.

Note that, "X to Y" means "X or more and Y or less" in the present invention.

A three-dimensional shaping device according to the present invention comprises: a layer forming device to forma layer of metal powder on a shaping object; and a laser light irradiation device to irradiate the layer of metal powder formed by the layer forming device with a laser light. The laser light has a pulsed output waveform with a frequency of 5 to 200 kHz, a pulse width of 5 to 200 μs and a peak output of 10 to 500 W. Further, an overlap rate, which is a rate at which irradiation spots generated on the layer of metal powder by two successive pulses of the laser light overlap with each other, is 50 to 99.9%.

Effect of the Invention

According to the present invention, a three-dimensional shaping method and a three-dimensional shaping device, which are capable of shaping a shaping body having a narrower shaping width, can be provided.

MODE FOR CARRYING OUT THE INVENTION

An embodiment of the present invention will be explained in detail appropriately with reference to drawings. The same symbol is designated to common components or similar components in each drawing, and a duplicated explanation is omitted.

Figure 1:
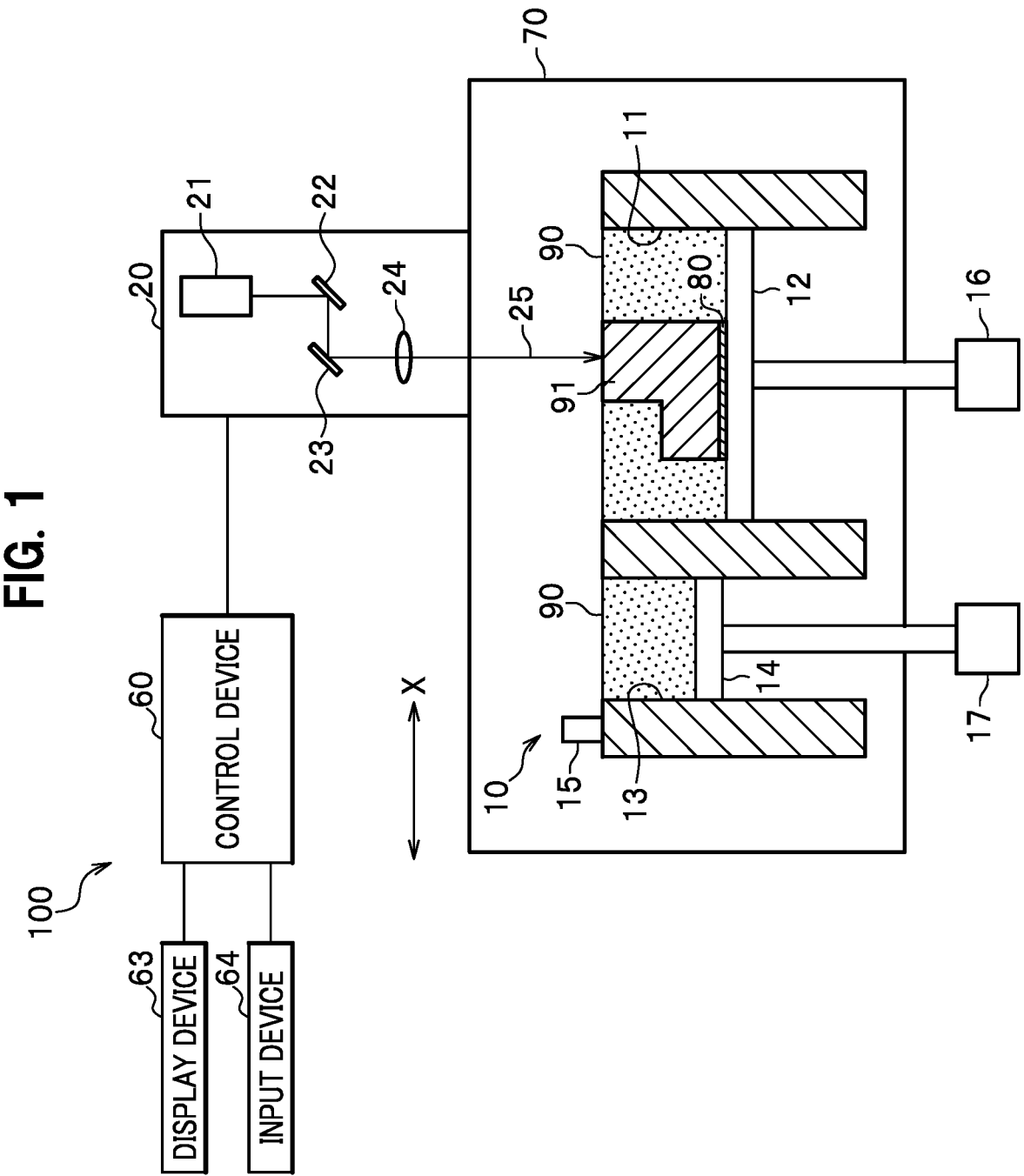
FIG. 1 is a view showing a configuration of a three-dimensional shaping device according to an embodiment of the present invention.

FIG. 1 is a view showing a configuration of a three-dimensional shaping device 100 according to an embodiment of the present invention.

The three-dimensional shaping device 100 according to this embodiment is a three-dimensional shaping device which shapes a three-dimensional shaping body 91 by irradiating a layer of metal powder 90 with a laser light 25. Here, the three-dimensional shaping device 100 is a three-dimensional shaping device which adopts the PBF method.

As shown in FIG. 1, the three-dimensional shaping device 100 includes a layer forming device 10, a laser light irradiation device 20, and a control device 60. The layer forming device 10 is housed in a chamber 70.

The layer forming device 10 includes a layer forming room 11, a shaping stage 12, a powder supply room 13, a supply stage 14, and a recoater 15.

The layer forming room 11 has a housing shape having an opening at the top thereof. The shaping stage 12 is housed in the layer forming room 11, and supported so that the shaping stage 12 can be raised up and lowered down in an upper-lower direction. The shaping stage 12 can be raised up and lowered down by a lift device 16. A base member 80 as a shaping object is disposed on the shaping stage 12.

The powder supply room 13 is disposed adjacent to the layer forming room 11. The powder supply room 13 has a housing shape having an opening at the top thereof. The supply stage 14 is housed in the powder supply room 13 and supported so that the supply stage 14 can be raised up and lowered down in the upper-lower direction. Particulate powder 90 is laminated on the supply stage 14 in the powder supply room 13. The supply stage 14 can be raised up and lowered down by a lift device 17. The powder 90 is raised upward from the top opening of the powder supply room 13 by the supply stage 14 being rising.

The recoater 15 is disposed near the top opening of the powder supply room 13, and, for example, includes a roller or a blade. The recoater 15 moves in an X-direction (horizontal direction) by a motor (not shown), and reciprocates between the powder supply room 13 and the layer forming room 11.

The recoater 15 moves the powder 90 raised from the top opening of the powder supply room 13 in the horizontal direction to supply it into the layer forming room 11 by moving in the X-direction (right direction). And a layer of the powder 90 is formed on the shaping stage 12 by the powder 90 deposited on the shaping stage 12 in the layer forming room 11.

As the metal powder 90, an alloy such as an aluminum alloy, an iron alloy, a stainless steel alloy, a titanium alloy, and a metal nitride alloy can be used.

The laser light irradiation device 20 irradiates a layer of the powder 90 formed by the layer forming device 10 with the laser light 25. The laser light irradiation device 20 includes a laser light source 21, mirrors (Galvano mirrors) 22, 23, and a lens system 24.

The laser light source 21 emits the laser light 25. A fiber laser, $CO_2$ laser or the like can be used as the laser light source 21. The lens system 24 focuses the laser light 25. Further, by changing angles of the mirrors 22, 23 by a driving device (not shown), an irradiation direction of the laser light 25 is changed. That is, a position at which irradiation of the laser light 25 is performed is adjusted by rotations of the mirrors 22, 23.

It is preferable that the scanning speed (shaping speed) at which the laser light 25 scans over a layer of the powder 90 is 10 to 1000 mm/s, and more preferable that the scanning speed is 50 to 150 mm/s. In a case where the scanning speed is equal to or more than the lower limit of 10 mm/s (50 mm/s), the thermal affection caused by the laser light 25 can be suppressed from spreading widely and a shaping width can be made smaller. On the other hand, in a case where the scanning speed is equal to or less than the upper limit of 1000 mm/s (150 mm/s), a molten state can be maintained.

In a three-dimensional shaping, an aimed position of the shaping object to be shaped next is heated by irradiation of the laser light 25 just before. The absorption rate of the laser light 25 in the shaping object depends on temperature and is higher as the temperature is higher. Accordingly, by setting the scanning speed to the above-mentioned upper limit or less, a portion, which has not been heated enough under the affection of a thermal conductivity, i.e., a physical property value, of the shaping object since the scanning speed is too fast, can be prevented from being irradiated with the laser light 25. Note that, since the thermal conductivity varies according to the material of the shaping object, the above-mentioned upper limit of the scanning speed depends on the material of the shaping object.

Figure 2:
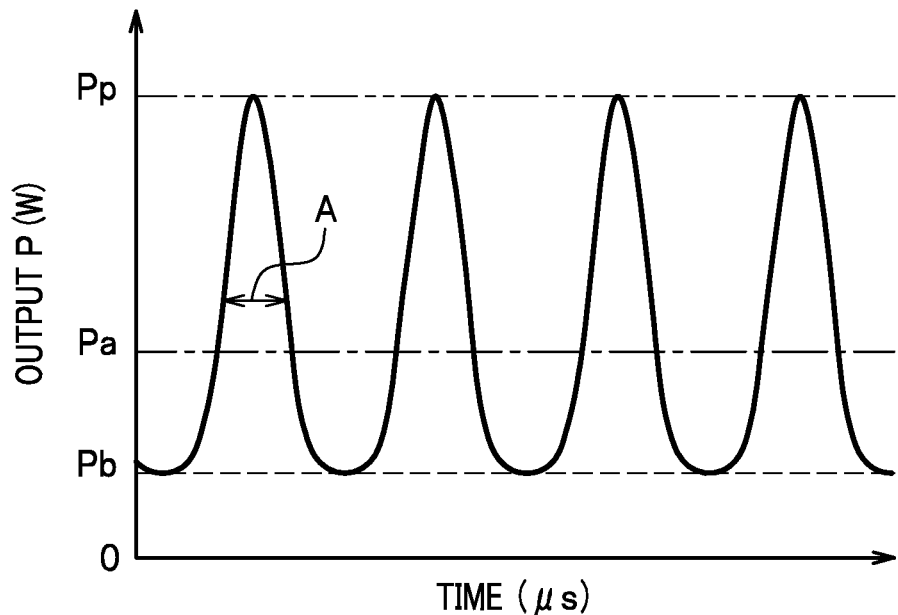
FIG. 2 is a graph showing an output waveform of a laser light.

FIG. 2 is a graph showing an output waveform of the laser light 25.

As shown in FIG. 2, the laser light 25 is a pulse oscillation laser. That is, the laser light 25 has a pulsed output waveform. Since irradiation can be performed with a smaller output power by using a pulse oscillation laser, the thermal affection on the shaping object (base member 80 or a part having shaped already), which is a base member for shaping, can be reduced, and the deformation of the shaping body 91 can be more reduced.

It is preferable that the overlap rate, which is a rate at which irradiation spots generated on a layer of the powder 90 by two successive pulses of the laser light 25 overlap with each other, is 50 to 99.9%, and more preferable that the overlap rate is 70 to 99%. By setting the overlap rate to the lower limit of 50% (70%) or more, failing to obtain an accurate shape because of a round irradiation spot of the laser light 25 can be avoided. On the other hand, by setting the overlap rate to the upper limit of 99.9% (99%) or less, an effect due to a pulse oscillation laser described later can be obtained.

The overlap rate can be obtained by the following manner.

In a case where an irradiation spot diameter, a frequency, a scanning speed, and a pulse width are designated by D (μm), F (kHz), S (mm/s), and A (μs), respectively, a pulse repeat time T (s), a moving distance Lp (μm) in the pulth width, a pulse repeat distance Lt (μm), and the overlap rate R (%) can be obtained by the following equations.

$$T=1/(F\times 1000)$$

$$Lt=S\times T\times 1000$$

$$Lp=S\times A/1000$$

$$R=(1-((Lt-Lp)/D))\times 100,$$

where the moving distance Lp in the pulse width is, for example, the distance between the central position of an irradiation spot at the starting point of a first pulse and the central position of an irradiation spot at the ending point of the first pulse. The pulse repeat distance Lt is a distance, for example, between an irradiation spot central position of a starting point of a first pulse and an irradiation spot central position of a starting point of a second pulse.

Output characteristics of the laser light 25 to be used in this embodiment are as follows.

That is, it is preferable that a frequency is 5 to 200 kHz, and more preferable that the frequency is 10 to 100 kHz. In a case where the frequency is set to the lower limit of 5 kHz (10 kHz) or more, a thermal affection range due to the laser light 25 can be reduced and the shaping width can be made smaller. On the other hand, in a case where the frequency is set to the upper limit of 200 kHz (100 kHz) or less, The powder 90 can be suppressed from changing to a solid state after a too short time period of the molten state. Hereby, particles of the powder 90 melt and mix, so that an accurate shape can be obtained by shaping.

It is preferable that the pulse width A is 5 to 200 μs, and more preferable that the pulse width A is 10 to 100 μs. Here, the pulse width A is a time width corresponding to a middle value between an output (peak output Pp) at the top of a pulse and an output (base output Pb) at the bottom of the pulse. By setting the pulse width A to the lower limit of 5 μs (10 μs) or more, the powder 90 can be suppressed from changing to a solid state after a too short time period of the molten state. Hereby, particles of the powder 90 melt and mix, so that an accurate shape can be obtained by shaping. On the other hand, by setting the pulse width A to the upper limit of 200 μs (100 μs) or less, a thermal affection range due to the laser light 25 can be reduced and the shaping width can be made smaller.

It is preferable that the peak output Pp is 10 to 500 W, and more preferable that the peak output Pp is 20 to 100 W. By setting the peak output Pp to the lower limit 10 W (20 W) or more, not only the powder 90 but also the base member as the shaping object can be melted, so that joining can be reliably performed. On the other hand, by setting the peak output Pp to the upper limit of 500 W (100 W) or less, the powder 90 can be prevented from evaporating passing through a molten state because of a too high output and being destroyed by the expansion pressure. In addition, the surrounding powder 90 can be prevented from being blown off to lead to a failure of shaping.

In this embodiment, the output waveform of the laser light 25 is a waveform which varies repeatedly between the peak output Pp and the base output Pb larger than 0 W. But, the embodiment can also be done with the base output Pb being 0.

It is preferable that a mean output Pa of the laser light 25 is 5 to 300 W, and more preferable that the mean output Pa is 20 to 100 W. Here, the mean output Pa is a value obtained by dividing an integral value of the output waveform by the time of the integral interval. By setting the mean output Pa to the lower limit of 5 W (20 W) or more, the molten state can be kept. On the other hand, by setting the mean output Pa to the upper limit of 300 W (100 W) or less, the thermal affection due to the laser light 25 can be suppressed from spreading wide, and the shaping width can be made smaller.

It is preferable that the irradiation spot diameter of the laser light 25 is 10 to 100 μm, and more preferable that the irradiation spot diameter is 12 to 50 μm. By setting the irradiation spot diameter to the lower limit of 10 μm (12 μm) or more, actual use is secured. On the other hand, by setting the irradiation spot diameter to the upper limit of 100 μm (50 μm) or less, the thermal affection range due to the laser light 25 can be reduced and the shaping width can be made smaller.

As shown in FIG. 1, the chamber 70 is a vessel which is made of, for example, a metal such as stainless steel. The chamber 70 is configured so that it can be sealed, and the chamber 70 is depressurized by evacuating the inside of the chamber 70 with use of an exhaust mechanism (not shown). Furthermore, the exhaust mechanism also serves as an exhaust port for exhausting metal fumes (metal vapor) generated from the powder melted by the laser at the time of processing. An inert gas such as argon or nitrogen is supplied into the inside of the chamber 70 from which oxygen has been removed by vacuum suction. In addition, the chamber 70 is provided with a not-shown window for the laser light 25 to pass through.

The control device 60 is provided with a CPU (Central Processing Unit) and a storage part such as a memory, a hard disc, which are not shown. Three-dimensional shaping data of a three-dimensional structure to be shaped and processing condition data for the same are stored in the storage part. The three-dimensional shaping data and the processing condition data may be made by the control device 60, or may be made by an external device and inputted into the control device 60. The control device 60 controls the laser light source 21, the mirrors 22, 23, and the lens system 24 based on the processing condition data, and adjusts output characteristics, a scanning speed, a scanning interval, and an irradiation position of the laser light 25.

A display device 63 and an input device 64 are connected to the control device 60. The display device 63 is such as a liquid crystal display (LCD). The display device 63 displays various information such as an image, an operation screen, a message. The input device 64 is such as a key board, a mouse, and accepts user's operations for making or inputting the three-dimensional shaping data or the processing condition data and inputs various information such as an instruction of starting the three-dimensional shaping work.

Figure 3:
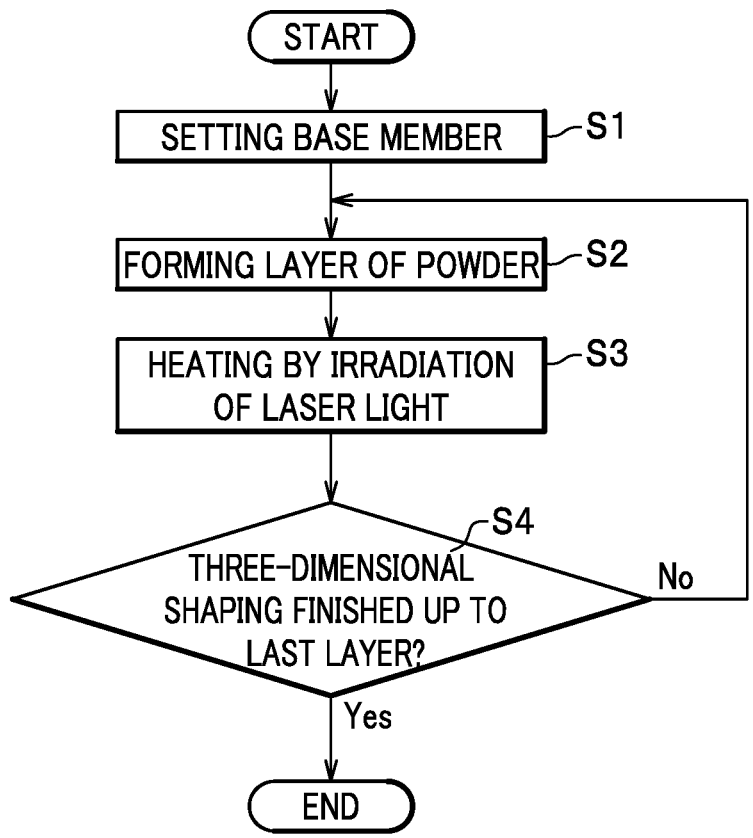
FIG. 3 is a flow chart showing contents of a three-dimensional shaping method according to the present embodiment.

FIG. 3 is a flow chart showing contents of a three-dimensional shaping method according to the present embodiment.

As shown in FIG. 3, first, the base member 80 is set onto the shaping stage 12 to be fixed (S1). Next, the inside of the chamber 70 is evacuated, and then an inert gas is supplied into the chamber 70.

Then, a layer of the powder 90 is formed on the base member 80 as a shaping object by the layer forming device 10 (S2). Here, the recoater 15 moves in the X-direction (right direction in FIG. 1), so that the powder 90 is moved horizontally to be supplied into the layer forming room 11 and the surface of a layer of the powder 90 is flattened.

Next, heating is performed by irradiation of the laser light (S3). That is, the control device 60 controls the laser light irradiation device 20 to irradiate the layer of the powder 90 with the laser light 25. Hereby, the powder 90 is melted and bonded to form a shaping region which has been solidified.

At step S4, it is judged whether or not the three-dimensional shaping is finished up to the last layer. That is, the control device 60 judges whether or not the three-dimensional shaping, in which layers of a shaping region solidified by irradiating a predetermined region of a layer of the powder 90 with the laser light 25 are laminated one layer by one layer, is finished up to the last layer (the top layer).

In a case where it is judged that the three-dimensional shaping is not finished up to the last layer (No at S4), the control device 60 controls to return the processing back to step S2 and carry out the three-dimensional shaping (S2, S3, S4) for the next layer. In addition, the powder 90 which has not been used in shaping the previous layer is not removed and a proper amount of the powder 90 is supplied thereon to form the next layer having a predetermined thickness (S2). On the other hand, in a case where it is judged that the three-dimensional shaping is finished up to the last layer (Yes at S4), the control device 60 controls to stop the three-dimensional shaping work.

As described above, the laser light 25 to be used in the three-dimensional shaping device 100 according to the embodiment has a pulsed output waveform with a frequency of 5 to 200 kHz, a pulse width A of 5 to 200 has and a peak output Pp of 10 to 500 W. Furthermore, the overlap rate, which is a rate at which irradiation spots generated on a layer of the powder 90 by successive two pulses of the laser light 25 overlap with each other, is 50 to 99.9%.

In such a configuration, the laser light 25, which is a pulse oscillation laser with specific output characteristics, irradiates a layer of the powder 90. Hence, since a mean output becomes lower because of the pulsed output waveform, a shaping width (overlaid bead) can be reduced and the continuity of shaping can be kept even under the lower output condition. Therefore, by this embodiment, a shaping body having a narrower shaping width can be shaped.

On the other hand, in a case where CW (continuous oscillation) laser is used, under the lower output condition, the continuity of shaping is impaired by the defect called as balling as described above. Further, in the three-dimensional shaping, joining is completed by mixing of particles of the powder 90 into a molten pool and solidifying of the molten pool. But in a case of using CW laser, in rare cases, a front end part of the molten pool is formed in a steep slope shape. Hereby, the vapor flow rising from the molten pool is greatly inclined toward the front in the advancing direction to blow off the particles of the powder 90 to be merged. Accordingly, there is a concern that particles necessary for the shaping are depleted to impair the continuity of the shaping.

To the contrary, in this embodiment, although there is a case where a front end part of the molten pool is formed in a steep slope shape, since the vapor flow repeatedly occurs and vanishes according to the pulse width A, the particles of the powder 90 existing in the front can be restrained from being blown off, because of the vanishment of the vapor flow. Furthermore, the molten pool sways in small steps according to the frequency of the pulsed output waveform, so that the uniformity of the shaping width can be enhanced. In addition, the high peak output Pp allows a lot of particles of the powder 90 to be attracted from the surroundings to merge. Thus, the continuity of the shaping can be kept even under the lower output condition.

In a case of the pulse oscillation laser, when the laser medium is rapidly excited from an oscillation stopped state (output value of 0 W), there is a concern that a spike-shaped high output section with a width of a few µs or less is generated at the oscillation rising part because of the relaxation oscillation phenomenon. In this embodiment, the output waveform of the laser light 25 is made to be a waveform whose output value is repeatedly varied between the base output Pb larger than 0 W and the peak output Pp, so that the spike-shaped high output section due to the relaxation oscillation phenomenon can be restrained from being generated.

In the above, the present invention is explained based on the embodiment, but the present invention is not limited to the configuration described in the embodiment. The present invention may appropriately change the configuration without departing from the spirit of the present invention, including appropriately combining or selecting the configurations described in the above-described embodiment. Furthermore, regarding a part of the configuration in the above-described embodiment, adding, deleting, or replacing may be performed.

For example, in the above-described embodiment, the three-dimensional shaping device 100 is a three-dimensional shaping device according to the PBF method, but the device is not necessarily limited to this. The three-dimensional shaping device 100 may be, for example, a device provided with a layer forming device that forms a layer of metal powder by dropping the powder 90 onto the shaping object to supply and accumulate the same.

Experimental Examples

Advantageous effects of the present invention will be explained using the following experimental examples. Of course, the technical scope of the present invention is not limited to the following experimental examples.

The experiments were performed on narrowing the shaping width (overlaid bead width) using the pulse oscillation laser.

The overlap rate of irradiation spots generated by successive two pulses was set to 95% or more. In specific, a frequency of 25 kHz was adopted at a scanning speed (shaping speed) of 100 mm/s, and a frequency of 50 kHz was adopted at a scanning speed (shaping speed) of 200 mm/s. Furthermore, the diameter of an irradiation spot of the pulse oscillation laser was 16.5 µm. Furthermore, a plurality of pulsed output waveforms were made to perform shaping with each output waveform by arbitrarily setting the peak output Pp in the range of 47 to 77 W, and the pulse width A in the range of 10 to 30 µs. In addition, a powder 90 of Titanium having a particle size of 25 to 38 µm and a base member 80 made of Titanium were used.

Figure 4:
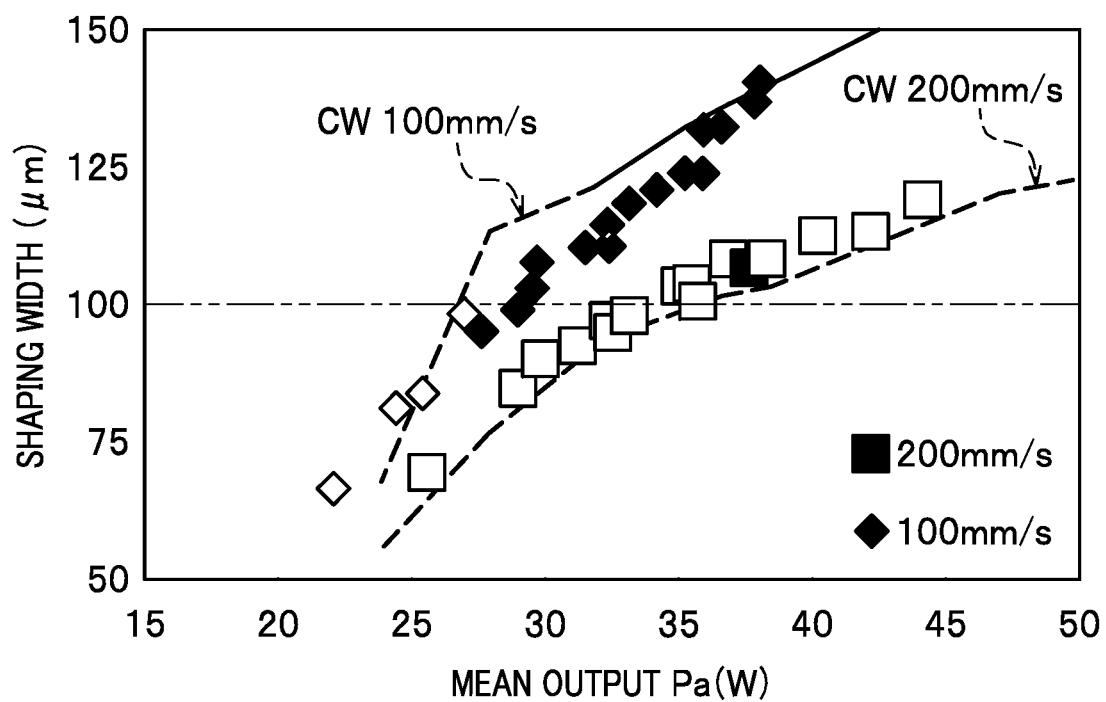
FIG. 4 is a graph showing relations between a mean output and a shaping width in a case where an experiment for shaping was carried out with use of a pulse oscillation laser.

FIG. 4 is a graph showing relations between a mean output and a shaping width in a case where experiments for shaping were performed with use of a pulse oscillation laser. In FIG. 4, each black mark indicates a condition resulting in continuous shaping, and each white mark indicates a condition resulting in discontinuous shaping.

In addition, in FIG. 4, trend lines in experiments with use of CW (continuous oscillation) laser are shown by solid line or broken line. Here, the solid line means conditions of shaping having continuity, and the broken line means conditions of shaping having discontinuity.

As shown in FIG. 4, it can be confirmed that the shaping width tends to narrow under conditions of a higher scanning speed and a lower output, where the molten region is narrowed.

In the case of a scanning speed of 100 mm/s, it can be seen that the shaping width tends to narrow in the case with use of the pulse oscillation laser more than in the case with use of CW laser having the same mean output. Further, considering the continuity of shaping, it can be seen that the minimum shaping width of about 95 µm, which is less than 100 µm, is attained in the case with use of the pulse oscillation laser. That is, an effect of narrowing the shaping width in the case with use of the pulse oscillation laser can be confirmed.

Incidentally, in the experiences, at the scanning speed of 200 mm/s, a clear effect due to the pulse oscillation laser was not confirmed.

DESCRIPTION OF THE SYMBOLS

10 Layer forming device
20 Laser light irradiation device
25 Laser light
90 Powder
100 Three-dimensional shaping device
A Pulse width
Pp Peak output
Pb Base output
Pa Mean output

The invention claimed is:

1. A three-dimensional shaping method, comprising:
a layer forming process to form a layer of metal powder on a shaping object; and
a laser light irradiation process to irradiate the layer of metal powder formed in the layer forming process with a laser light,
wherein the laser light has a pulsed output waveform with a frequency of 5 to 200 kHz, a pulse width of 5 to 200 µs, and a peak output of 20 to 100 W and a mean output of 20 to 100 W, and
wherein an overlap rate, which is a rate at which irradiation spots generated on the layer of metal powder by two successive pulses of the laser light are overlapped with each other when the laser light scans over the layer of metal powder, is 50 to 99.9%,
wherein the pulse width is a time width corresponding to a middle value between an output at a top of a pulse and an output at a bottom of the pulse, and
wherein in a case where an irradiation spot diameter, a frequency, a scanning speed, and the pulse width are designated by D (µm), F (kHz), S (mm/s), and A (µs), respectively, a pulse repeat time T (s), a moving distance Lp (µm) in the pulth width, a pulse repeat distance Lt (µm), and the overlap rate R (%) are obtained by the following equations:

$T=1/(F\times1000)$ $Lt=S\times T\times1000$ $Lp=S\times A/1000$ $R=(1-((Lt-Lp)/D))\times100.$ 2. The three-dimensional shaping method according to claim 1, wherein the output waveform is a wave that an output value repeatedly changes between a base output larger than 0 W and the peak output.

3. A three-dimensional shaping device, comprising:
a layer forming device to form a layer of metal powder on a shaping object; and
a laser light irradiation device to irradiate the layer of metal powder formed by the layer forming device with a laser light,
wherein the laser light has a pulsed output waveform with a frequency of 5 to 200 kHz, a pulse width of 5 to 200 µs, a peak output of 20 to 100 W and a mean output of 20 to 100 W,
wherein an overlap rate, which is a rate at which irradiation spots generated on the layer of metal powder by two successive pulses of the laser light are overlapped with each other when the laser light scans over the layer of metal powder, is 50 to 99.9%,
wherein the pulse width is a time width corresponding to a middle value between an output at a top of a pulse and an output at a bottom of the pulse, and
wherein in a case where an irradiation spot diameter, a frequency, a scanning speed, and the pulse width are designated by D (µm), F (kHz), S (mm/s), and A (µs), respectively, a pulse repeat time T (s), a moving distance Lp (µm) in the pulth width, a pulse repeat distance Lt (µm), and the overlap rate R (%) are obtained by the following equations:

$T=1/(F\times1000)$ $Lt=S\times T\times1000$ $Lp=S\times A/1000$ $R=(1-((Lt-Lp)/D))\times100.$

* * * * *